United States Patent [19]

Humberstone

[11] 4,424,436

[45] Jan. 3, 1984

[54] METHOD OF FORMING CRUCIBLES FOR MOLTEN MAGNESIUM

[75] Inventor: Kenneth J. Humberstone, Pepper Pike, Ohio

[73] Assignee: American Tank & Fabricating Company, Cleveland, Ohio

[21] Appl. No.: 334,212

[22] Filed: Dec. 24, 1981

Related U.S. Application Data

[62] Division of Ser. No. 220,741, Dec. 29, 1980, Pat. No. 4,353,535.

[51] Int. Cl.³ .......... B23K 9/00

[52] U.S. Cl. .......... 219/137 R; 219/137 WM; 219/146.1; 219/61

[58] Field of Search .......... 219/137 R, 60 R, 61, 219/72, 137 WM, 146.1

[56] References Cited

U.S. PATENT DOCUMENTS

| | | | |
|---|---|---|---|
| 655,457 | 8/1900 | Savery | 228/184 |
| 1,784,080 | 12/1930 | Stresau | 219/137 R |
| 2,071,233 | 6/1936 | Merk | 266/275 |
| 2,110,891 | 3/1938 | Bitterfeld et al. | 75/126 C |
| 2,183,715 | 12/1939 | Franks | 75/160 |
| 2,209,402 | 7/1940 | Kepler | 228/184 |
| 2,244,064 | 6/1941 | Hodge | 219/137 WM |
| 2,633,419 | 3/1953 | Pyk | 75/65 R |
| 2,819,517 | 1/1958 | Pursell | 219/137 R X |

FOREIGN PATENT DOCUMENTS

| | | |
|---|---|---|
| 604736 | 9/1960 | Canada . |
| 1421244 | 1/1976 | United Kingdom . |

OTHER PUBLICATIONS

Cary, Howard, *Modern Welding Technology,* Prentice-Hall, N.J., 1979, p. 421, "Ferritic Stainless Steels".

*Primary Examiner*—B. A. Reynolds
*Assistant Examiner*—Catherine Sigda
*Attorney, Agent, or Firm*—Yount & Tarolli

[57] ABSTRACT

A crucible for containing molten magnesium, and a process for forming the crucible. The crucible is formed from ferritic stainless steel, and particularly type 444 stainless steel plate. The method involves forming ferritic stainless steel plate into component parts of the crucible, while maintaining the ferritic stainless steel plate at temperatures above about 200° F. but below the "blue brittle" temperature range. Further, the method involves special techniques for welding the crucible parts. Specifically, the crucible parts are preheated to a temperature of 100° -150° C. and are completely welded by a process utilizing multiple welding passes with a special metal inert gas shielded welding technique before any cool down of the crucible parts below 100° C. is allowed. The welds extend completely through the crucible walls, which are the thickness of steel plate, and completely incorporate the crucible parts while being essentially free of cracks.

10 Claims, 9 Drawing Figures

METHOD OF FORMING CRUCIBLES FOR MOLTEN MAGNESIUM

This is a division of application Ser. No. 220,741, filed Dec. 29, 1980, now U.S. Pat. No. 4,353,535.

GENERAL BACKGROUND

This invention relates to metal crucibles for containing materials such as molten magnesium, and to forming steps for use in constructing such crucibles.

Magnesium is used in applications where a metal of low weight and moderate strength is required. Commonly, magnesium articles are made by casting molten magnesium into the desired form.

There are metallurgical problems involved in the handling of molten magnesium. Molten magnesium attacks many metal alloys. Many metals (e.g., nickel, copper) are soluable in magnesium and can contaminate magnesium and make it unsuitable for use. Further, molten magnesium is usually handled at temperatures and in environments which are highly corrosive to many metals.

Magnesium crucibles have been fabricated of metal plate of mild carbon steel or cast steel with negligible nickel content. Such metals, in plate form, are readily cold worked at room temperatures to form component parts of the crucible. The component parts of the crucible are then welded together to complete the crucible.

However, a crucible formed of low alloy steels has a very limited lifetime in the highly corrosive environment of a magnesium melting furnace. The exterior of the crucible is subjected to heavy oxidation (corrosion) resulting in gross scaling of the outer surfaces of the crucible. This scaling is aggravated by intense heating and subsequent cooldown which results in cracking of the scale and the adjacent metal. Scaling not only decreases the efficiency of heat input to the crucible but ultimately results in such degradation of the material that it is either no longer useful or requires extensive reconditioning to make it useful. The lifetime of such a crucible is therefore quite short, often no more than several days.

One technique which has been used to try and reduce the effects of scaling has been to apply a layer of chromium cladding on the external surface of a low alloy crucible. The cladding has been primarily used to try to decrease exterior corrosion. However, there are practical and technical difficulties in using this technique. Technically, the chromium cladding, which is brittle, may crack during application or while in service. Practically (economically), the increased lifetime for magnesium melting crucibles with chromium cladding has not been sufficient to offset the greatly increased cost of the cladding material.

SUMMARY AND FURTHER BACKGROUND OF THE INVENTION

The applicant believes that, as disclosed in this application, he has found a crucible construction, and a method of forming the crucible, which produce a crucible with a significantly increased life in comparison to previous crucibles for containing molten magnesium. Moreover, the method includes certain metal fabricating techniques which, in and of themselves, may constitute important contributions to the art of fabricating and welding high chromium ferritic stainless steels. In order to fully evaluate the contribution which is being made to the art by this invention, it is believed to be important to appreciate the types of problems which the applicant faced in arriving at the invention.

For example, according to the invention, the crucible is formed from components made of ferritic stainless steel having the thickness of plate steel (at least 3/16" thick), and which components are welded together. Ferritic stainless steels, and many weld materials which might be useful with ferritic stainless steels, have a "hot short" characteristic. That is, they are prone to forming cracks as they cool from the temperature ranges at which the weld material is deposited. The formation of even microscopically sized cracks makes the crucible unsuitable for handling molten magnesium, because those cracks will grow, and quickly make the crucible unusable. Moreover, the welds must be strong enough to join the relatively thick ferritic stainless steels, and to withstand the relatively volatile conditions involved in handling molten magnesium. To make a crucible suitable for handling molten magnesium, the applicant has had to produce virtually 100% effective welds which extend completely through the relatively thick walls of the crucible, which completely incorporate the ferritic stainless steel components, and which are essentially free of cracks (i.e., no visible cracks when subjected to X-ray and/or magnaflux inspection).

Certain components of the crucible of the invention are preferably formed of a type 444 ferritic stainless steel plate, manufactured by Jones and Laughlin. Type 444 is ferritic stainless steel of the 18-2 chromium, molybdenum type having a low carbon content. Forming a crucible from type 444 steel in plate form has presented its own obstacles for the applicant to overcome. Specifically, in the applicant's experience, 400 series stainless steels, particularly in plate form, are usually formed (worked) at elevated temperatures above about 1100° F. where the ductility of the metal is known to be satisfactory for working. Despite broad suggestions that such steels may be "cold worked" at room temperatures, applicant believes that the brittleness of the steel in plate form tends to discourage its cold working. However, as set forth in this application, applicant has found that plate type 444 steel can be worked, for applicant's purposes, in specific temperature ranges.

According to the invention, applicant has provided highly corrosion resistant crucibles with components parts formed from a high-chromium, low carbon ferritic stainless steel plate, preferably type 444. The crucibles are basically open topped container-like structures having side wall and bottom wall components which are welded together. The welds completely incorporate the component parts, and extend completely through the relatively thick walls of the crucible. Importantly, the welds are free of even microscopically sized cracks.

The side wall parts of the crucible are formed from ferritic stainless steel plate. The ferritic stainless steel plate, preferably type 444 steel plate, is formed into the side wall parts in a manner which appears to depart from the metallurgically obvious way such formation might be expected. Specifically, it has been recognized that ferritic stainless steel such as type 444, particularly in plate form, are too brittle to be worked at room temperature. However, applicant has found that maintaining the ferritic stainless steel plate at a temperature above about 200° F. but below the "blue brittle" temperature range during fabrication allows formation of the ferritic steel plate into the side wall parts of the crucible without cracking the steel plate.

In welding components of the crucible, opposed portions of the components are bevelled and are placed in close proximity to each other. The opposed portions are then preheated to a temperature in the range of 100°-150° C., and are enveloped in a special inert gas (argon or helium) back shielding atmosphere before any welding takes place. Then, the opposed portions are welded by multiple welding passes utilizing a metal inert gas (MIG) process, preferably open arc with argon shielding. Importantly, according to the invention, the entire weld is completed before allowing the opposed portions to cool below their preheated temperature. Normally, in multiple pass welding it is not uncommon to make several welding passes to partially complete a weld, allow the partially welded material to cool, and thereafter reheat the material and complete the weld. This technique is quite satisfactory in many welding applications. On the other hand, the present invention requires the entire weld to be completed before the component parts are allowed to drop below their preheated temperature. This technique has been found important in avoiding formation of microscopic cracks in the weld.

In accordance with the invention, the weld rod material for the initial passes of a multi-pass welding operation are formed of a nickel-free, high-chromium ferritic stainless steel alloy which is compatible with the ferritic stainless components.

Through the use of the present invention, it has been found that crucibles of corrosion-resistant ferritic stainless steel can be fabricated which show a six-to-tenfold increase in lifetime over cast steel or low alloy carbon fabricated steel crucibles.

Thus, it is a basic object of this invention to provide a new and useful crucible for handling materials such as molten magnesium.

It is another basic object of this invention to provide a process for forming and welding high chromium, low carbon, relatively thick stainless steel without breaking or cracking the plate material, and without inducing cracking in the weld.

BRIEF DESCRIPTION OF THE DRAWINGS

The foregoing and other objects of the invention will become apparent from the following detailed description taken with reference to the accompanying drawings wherein.

DETAILED DESCRIPTION OF THE PREFERRED EMBODIMENT

Figure 1:
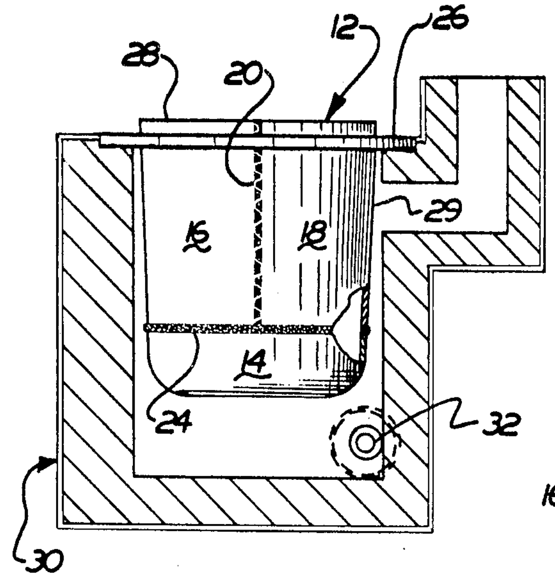
FIG. 1 is a side view of a crucible made in accordance with the invention supported in a portion of a magnesium melting furnace.
Figure 2:
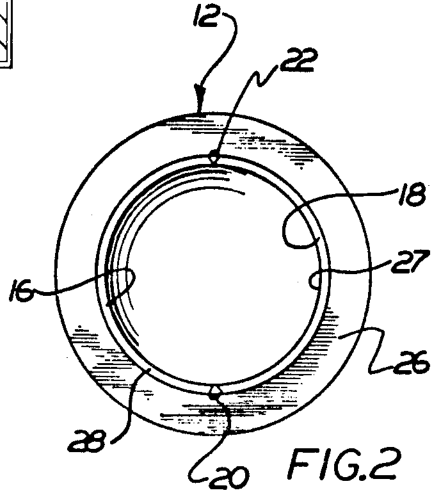
FIG. 2 is a top view of the crucible of FIG. 1.
Figure 4:
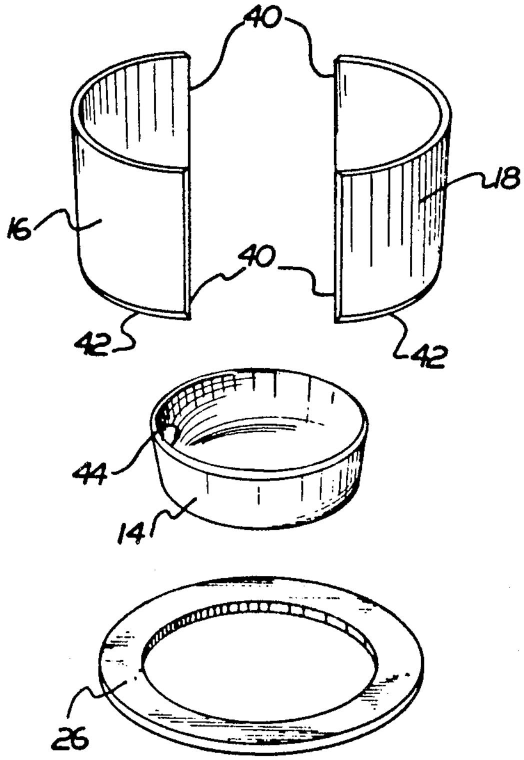
FIG. 4 is an exploded perspective view of the component parts of the crucible of FIG. 1, before being welded together.

A magnesium crucible or melting pot formed according to the invention is shown at 12 in FIG. 1. Its component parts are shown in FIG. 4 before assembly. The crucible includes a rounded bottom wall 14, a pair of side wall halves 16 and 18, and a flange 26 or collar. The side wall halves 16 and 18 are formed by the process set forth hereinafter and are welded along adjacent edges 40 to form weld seams 20 and 22 (FIG. 2). The side wall halves 16, 18 are welded to the round bottom wall 14 to form a base weld seam 24.

The collar 26 encircles the outer periphery of the side wall halves 16, 18 and is welded thereto. Preferably, the collar 26 is located near the top edge 28 of the side wall halves 16, 18. As is known in the art, the support collar 26 functions as a rest from which the crucible 12 is suspended a melting furnace 30 (FIG. 1).

As seen from FIGS. 1 and 2, the resulting crucible is basically an open topped container with an inside surface 27 and an outside surface 29. Importantly, the various weld seams (e.g., weld seams 20, 22, 24) extend completely through the crucible from the inside surface to the outside surface, and are essentially free of cracks. The term "essentially free of cracks", as used in this application, means there are no visible cracks when subjected to X-ray and/or magnaflux inspection, as will be readily appreciated by those skilled in the art.

In the melting furnace 30 material in the crucible 12 is heated with a burner 32. The atmosphere within the melting furnace 30 is usually strongly oxidizing. With the use of crucibles made from low carbon steel or cast steel, heavy oxide scaling of the exterior portions of the crucibles which are exposed to this corrosive atmosphere occurs. Melting temperatures in a typical magnesium melting furnace range from 1100° F. to 1650° F. At these temperatures, typical prior crucibles have short lifetimes, sometimes only a few days.

In order to increase crucible lifetime in the highly oxidizing atmosphere of the melting furnace 30, the crucible 12 of the invention is preferably fabricated from a high-chromium, low-carbon ferritic stainless steel, preferably a type 444 stainless steel as manufactured by Jones and Daughlin. Type 444 stainless steel plate has the following approximate chemical composition:

| Element | Percent by Weight |
|---|---|
| Carbon | 0.016% |
| Manganese | 0.25% |
| Phosphorous | 0.025% |
| Sulphur | 0.001% |
| Silicon | 0.70% |
| Chromium | 18.00% |
| Nickel | 0.56% |
| Molybdenum | 1.83% |
| Copper | 0.12% |
| Colombium | 0.33% |
| Titanium | 0.17% |

This composition is typical of a 400 Series 18-2 chromium-molybdenum ferritic stainless steel. The nickel and copper content of the ferritic stainless steel plate is very low to avoid contamination of magnesium through dissolution of nickel and copper from the crucible during use. Moreover, applicant believes the type 444 steel could be further improved, for the purpose of this invention, by totally eliminating the nickel and copper content.

The ferritic stainless steel is used in plate form (at least 3/16" thick and over 48" wide) to form the side wall halves 16, 18 of the crucible. The fabricating technique for forming the ferritic stainless steel plate into the side wall halves 16, 18 is shown schematically in FIG. 3. Basically, the ferritic stainless steel plate is roll formed into each of the side wall halves 16, 18. As seen from FIG. 3 a flat plate member 34 is being formed into one of the side wall halves. The plate member 34 is formed around a mandril 36 of appropriate shape by forming rolls 38. The mandril 36 and the forming rolls 38 are moved relative to each other in the direction shown by the arrows from the position shown by solid lines in FIG. 3 to those indicated by dashed lines. In the process, a side wall half 34' is fabricated.

Of course, the side wall halves 16, 18 must be secured to each other along two adjacent edges to form the side wall of the crucible. It is also contemplated that, rather than forming two side wall halves 16, 18, a single piece side wall member can be formed. With a single piece side wall member, there could be only one pair of adjacent edges to be welded together. The single piece side wall member can also be roll formed by a similar technique to that used to form the side wall halves 16, 18.

Figure 3:
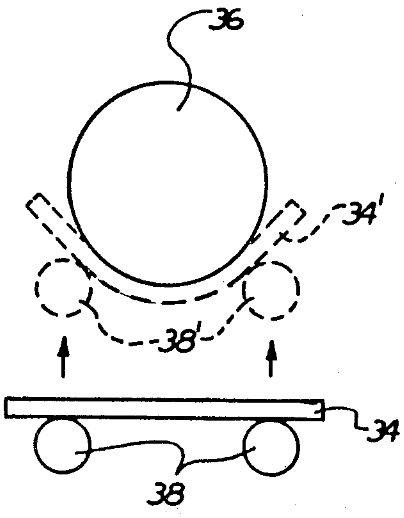
FIG. 3 is a schematic view of the roll forming operation used to form certain components of the crucible according to the invention.

Forming techniques such as illustrated in FIG. 3 for forming low alloy steel plates into magnesium crucible components are ordinarily carried out at room temperatures. According to the invention, however, it has been determined that type 444 ferritic stainless steel plate is too brittle at room temperature to be worked without cracking or breaking. On the other hand, it has been determined that type 444 stainless steel plate can be worked by the operation of FIG. 3 by maintaining the ferritic stainless steel plate at a temperature above about 200° F. but below the "blue brittle" temperature range of the metal during the forming operation. The "blue brittle" temperature range is a temperature range (usually between 450° F. and 700° F.) where high chromium steels are prone to become particularly brittle, as known in the art. The lower temperature limit is important because applicant has found that below 200° F. type 444 ferritic stainless steel plate is too brittle to be worked. The metal again becomes ductile at about 1100° F. and may again be worked at temperatures above this limit. Thus, according to the invention, the ferritic stainless steel plate 34 is maintained at a temperature above about 200° F. and preferably in a temperature range of 200°-300° F. during the forming operation.

Each of the side wall halves 16, 18 are roll formed in the foregoing manner. Alternatively, the side wall halves can be press formed while being maintained in the temperature range of 200°-300° F. Further, the bottom wall 14 is formed (preferably pressed) out of 444 ferritic stainless steel at about 1400° F. Naturally, the bottom wall 14 is formed in the same thickness as the side wall halves 16, 18. The side halves 16, 18 and the bottom wall 14 are then welded to each other, as set forth hereinafter.

FIGS. 5-9 illustrate the welding process for a pair of opposed plate metal portions 50, 52, which are ½" thick and which, in the formation of the crucible of FIG. 1 would be the side wall halves 16, 18. The opposed portions 50, 52 have bevelled surfaces 54, 56 which are preferably straight, and converge at an angle of 60°. Further, the surfaces 54, 56 extend from one surface 55 to the other surface 53 of the metal sections. When the opposed metal portions 50, 52 are components of the crucible, the surface 55 would be the outside surface of the crucible, and the surface 53 would be the inside surface. Thus, the bevelled surfaces 54, 56 would converge inwardly from the outside surface of the crucible to the inside surface of the crucible.

The welding of the opposed metal portions 50, 52 is accomplished by multiple passes between the bevelled surfaces 54, 56 using a metal inert gas (MIG) technique. Preferably, the welding is by means of an open arc argon shielded technique. In the applicant's experience, in welding a pair of surfaces by multiple pass arc welding, it is not uncommon to make several welding passes to partially weld the surfaces, allow the welds to cool, and to complete the weld at a later time. Often the welding passes are performed after preheating of the surfaces. For many steels, this procedure produces satisfactory welds.

However, in welding according to the principles of the invention, it has been found important to preheat the opposed portions in the area adjacent the bevelled surfaces 54, 56 to a temperature of 100°-150° F. prior to the welding thereof, and to prevent the opposed portions from falling below the preheat temperature until the entire multiple pass welding operation is completed. This has been found to be important in order to avoid cracking of the weld and adjacent metal.

Thus, the welding operation is preceeded by preheating the opposed metal portions 50, 52 in the area adjacent the bevelled surfaces 54, 56 to a temperature of 100°-150° F. Such heating may be by any means, but is preferably accomplished by directing a gas flame against the opposed metal portions 50, 52 in the area adjacent the bevelled surfaces 54, 56. A gas flame is preferred since oily or sooty residues should be avoided. Such residues represent a source of carbon which may alloy, in the heat of the weld, with the metal causing a localized increase in the carbon content.

The relatively thick metal portions 50, 52 constitute a heat sink which continually conducts heat away from the point at which it is primarily directed. In order to maintain the temperature of the opposed portions within the desired range, it is necessary to periodically or continuously reapply heat to these portions.

Before beginning the welding passes, the inside surface of the crucible, i.e., surface 53, is enveloped in an inert gas atmosphere. An "inert gas" contemplates a gas which is at least 90% inert gas (argon or helium), but may contain small amounts of oxygen and carbon dioxide. It is preferred that the opposed portions be suitably enclosed, and the enclosure filled with inert (preferably argon) gas. The welding passes are made by an open arc with argon shielding process, or a comparable metal inert gas (MIG) process.

Figure 5:
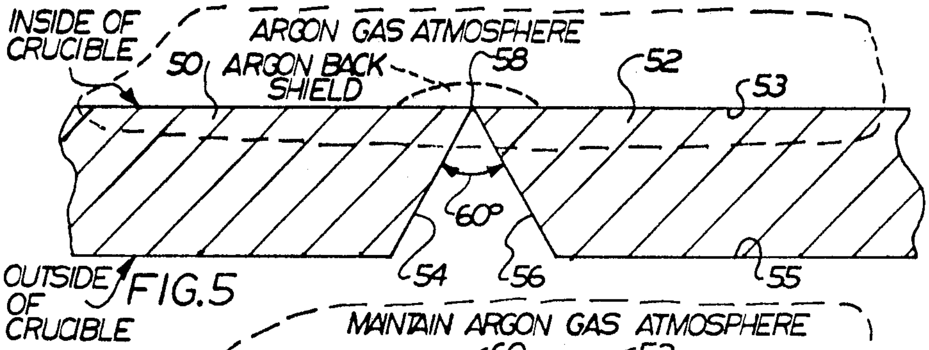
FIGS. 5-9 illustrate in cross-section, the progressive, steps of the welding operation of the invention.
Figure 6:
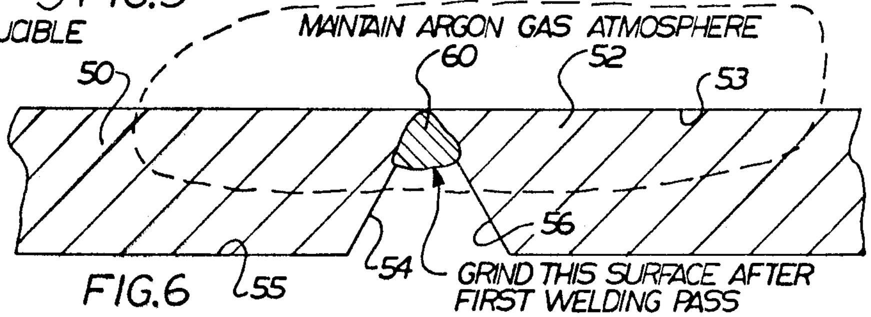

The first welding pass deposits a first weld bead 60 at the narrow apex 58 of the bevelled surfaces 54, 56 (see FIGS. 5 and 6). The first weld bead 60 is deposited by the open arc argon shielded welding process while the inert gas atmosphere acts as a back shield at the inside surface 53 of the crucible. The inert gas back shield removes oxygen, thus preventing oxidation at the inside of the weld. Further, the argon gas back shield helps prevent nitrogen from alloying with the type 444 steel. The inert gas back shield is maintained at least until portions of both bevelled surfaces have been incorporated into the weld.

The first weld bead 60 is deposited from the outside of the crucible. As seen from FIGS. 5 and 6, it incorporates portions of both bevelled surfaces 54, 56. The weld rod for forming the first weld bead 60 should have a low nickel and copper content to avoid contamination of the molten magnesium. Because of its corrosion resistance, and its compatibility with type 444 steel, a weld rod known as "18-2" and manufactured by ARMCO Steel Co. has been found to be a good material for welding the components of the crucible.

After the first weld bead 60 is deposited, the outside surface of the weld bead 60 is ground, while of course maintaining the area of the opposed metal portions 50, 52 adjacent the bevelled surfaces 54, 56 at least at the minimum preheat temperature of 100° C. It is believed the grinding removes any oxidation or slag generated surface cracks from the weld bead 60.

Figure 7:
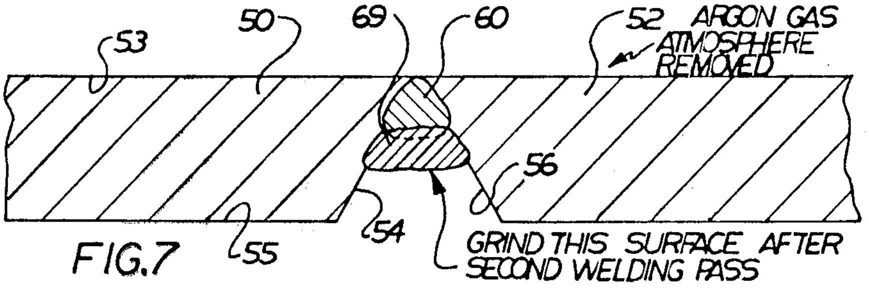
Figure 8:
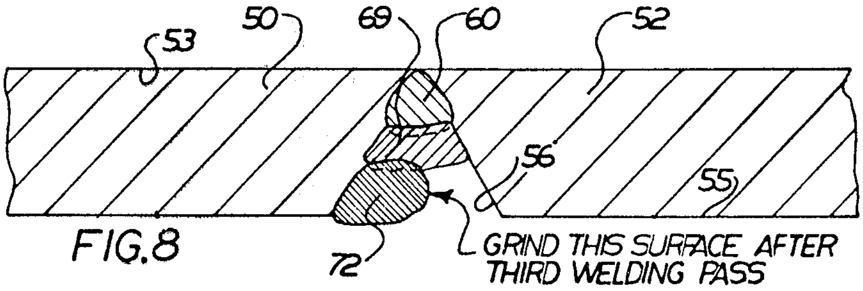
Figure 9:
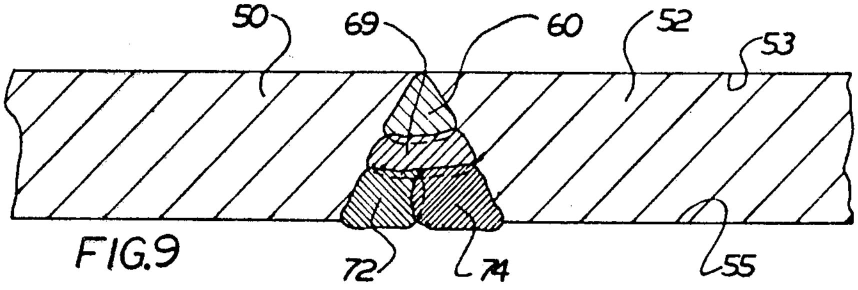

Another outside weld pass, by the open arc argon shielded process, thereafter applies a succeeding weld bead 69 between the bevelled surfaces 54, 56 outside the first weld bead 60 (FIG. 7). Before applying the weld bead 69, the inert gas back shielding atmosphere can be removed, since the weld bead 60 completely incorporates portions of both bevelled surfaces 54, 56 and thus eliminates the need for the inert gas back shield.

After application of weld bead 69, the outside surface of that weld bead is also ground. As seen from FIG. 7, the weld bead 69 incorporates the initial weld bead 60, as well as the bevelled surfaces 54, 56.

Two weld beads 72, 74 complete the weld. The weld bead 72 is deposited against, and incorporates, one of the bevelled surfaces (i.e., surface 54) and also the weld bead 69. This weld bead 72 is also deposited by an open arc argon shielded welding process. The exposed surface of weld bead 72, against which subsequent welding takes place, is ground in the same manner as the previous weld beads. The final weld bead 74 may be deposited against, and incorporates, the bevelled surface 56, the weld bead 69 and the weld bead 72. Again, as with the weld bead 72, the final weld bead 74 is deposited by an open arc argon shielded welding process.

The weld beads 72, 74 complete the incorporation of the bevelled surfaces 54, 56 into the weld. Since the weld beads 72, 74 are spaced from the inside of the crucible, and thus cannot contaminate molten magnesium in the crucible, a lesser grade, compatible stainless steel weld rod may be used to form those weld beads. For example, an austenitic type 309 stainless steel having moderately high nickel content may be used to give good corrosion resistance on the exterior surface of the crucible.

Of course, while the foregoing series of weld beads is suitable for welding a crucible with ½" thick walls, it is contemplated that additional welding beads may be applied for welding crucibles with thicker (e.g., ¾" or thicker) walls.

It will be noted that throughout the welding passes which deposit the weld beads 60, 69, 72 and 74, heat from the external source has been periodically or continuously applied to the opposed metal portions 50, 52. In accordance with the invention, the temperature of the opposed metal portions is maintained at least at the minimum 100° C. preheat temperature range. After the weld is completed, the welds and the bevelled surfaces 54, 56 are allowed to slowly cool to ambient temperature.

As noted above, the opposed metal portions 50, 52 represent the side wall halves 16, 18. Naturally, the two side wall halves require welding along two adjacent edges to form the side wall of the crucible. Then, the bottom wall 14 is joined to the side wall by means of the same welding process which is used to weld the side wall halves together. The bottom wall 14 and the adjacent surface of the side wall would be bevelled, to form converging surfaces 42, 44 (FIG. 3). The appropriate portions of the bottom wall 14 and the side wall would be preheated to 100°-150° C., and maintained at least at 100° C. while multiple welding passes are utilized to completely incorprate the converging surfaces 42, 44 into the weld. The inside surface of the crucible (i.e., the surface adjacent the apex of bevelled surfaces 42, 44) would be enveloped in an inert gas (argon) back shielding atmosphere until portions of both surfaces 42, 44 are incorporated into the weld.

The fabrication of the crucible 12 is completed by slipping the ring shaped support collar 26 over the exterior of the side wall from below and welding the support collar 26 to the side wall at a location spaced generally downwardly from the circular top edge 28 thereof.

The resulting crucible thus comprises components formed of ferritic stainless steel of plate-type thickness, and those components are joined to each other by weld material which extends completely through the crucible from the inside surface to the outside surface. Significantly, it has been found that with a crucible formed in this manner, the weld material completely incorporates the ferritic stainless steel components, and is essentially free of cracks.

While the invention has been described in the preferred embodiment thereof, it is contemplated that others will occur to those of ordinary skill in the art upon the reading and understanding of the foregoing specification. For example, as depicted in the drawings, the bevelled surfaces 54, 56 are preferably straight, and extend from the outside surface of the crucible to an apex at the inside surface of the crucible. However, the term "bevelled" should not be considered as strictly limited to that geometry. It is contemplated that the surfaces may converge from the outside to the inside of the crucible with a J-shaped geometry, which is known in the art. The initial weld bead would be deposited as described above, with inert gas backshielding enveloping the narrow gap between those surfaces at the inside of the crucible. The remaining weld beads would also be deposited in the manner described above. The bevelled surfaces may also converge from both the inside and outside walls to a narrow apex midway between the inside and outside walls, a geometry which is known in the art as a "double bevel". With such a geometry, the first weld bead would be deposited at the narrow apex utilizing the argon backshield technique described above. The remaining weld beads would extend both inwardly and outwardly from that initial weld bead to complete the weld.

It is believed that in view of the foregoing description, various other embodiments and modifications will become readily apparent to those of ordinary skill in the art.

Having thus described my invention, I claim:

1. A method of fabricating a ferritic stainless steel crucible for containing molten magnesium, including the steps of working ferritic stainless steel plates at temperatures above about 200° F. but below the blue brittle temperature range for the ferritic stainless steel plate to form side wall sections of a crucible, placing opposed portions of the side wall sections in close proximity to each other, heating the opposed portions of the side wall sections to 100°-150° C. and completely welding the opposed portions of the side wall sections to each other before allowing the temperature of the opposed portions of the side wall sections to drop belowl 100° C.

2. A method as set forth in claim 1 wherein said step of working said ferritic stainless steel plates to form the side wall sections comprises the step of roll forming said ferritic stainless steel plates while maintaining the temperature of said ferritic stainless steel plates above about 200° F. but below the blue brittle temperature range.

3. A method as set forth in claim 2 including the step of working type 444 ferritic stainless steel plates to form said side wall sections of said crucible.

4. A method as set forth in any of claims 2 or 3 wherein the step of welding the opposed portions of the side wall sections to each other comprises the steps of heating the opposed portions of the stainless steel plates to a temperature of 100°–150° C., welding the entire opposed portions of the stainless steel plates by means of multiple welding passes utilizing a metal inert gas welding process while maintaining the temperature of the opposed portions at 100°–150° C. and completing the welding of the opposed portions before allowing the temperature of the opposed portions to fall below 100° C., the welding of the opposed portions being preceded by providing an inert gas atmosphere enveloping parts of both opposed portions and maintaining the inert gas atmosphere until at least parts of both opposed portions are completely incorporated into the weld.

5. A method as defined in claim 4 wherein the step of welding the opposed portions of the ferritic stainless steel plates comprises the steps of making multiple welding passes between the opposed portions to complete the welding of the opposed portions before allowing the temperature of the opposed portions to drop below 100° C., and wherein each surface of a weld bead against which a succeeding weld pass is to be made is ground before the succeeding weld pass is made.

6. A method as set forth in claim 5 wherein the step of welding the opposed portions further comprises the steps of forming the opposed portions with bevelled surfaces, positioning the bevelled surfaces in a close-spaced adjacent relationship to each other, heating the opposed portions at least adjacent the bevelled surfaces to a temperature in a range of from 100°–150° C., maintaining said bevelled surfaces at least in the temperature range of 100°–150° C. and welding completely between all of the bevelled surfaces to be joined before allowing the temperature of the bevelled surfaces to fall below 100° C.

7. The method as set forth in claim 6 wherein the bevelled surfaces converge from a wide end at the outside wall of the crucible to an apex at the inside wall of the crucible, including the steps of providing an inert gas atmosphere enveloping the inside wall of the crucible, and depositing at least a first weld bead at the apex of the bevelled surfaces by means of a metal inert gas process while maintaining the inert gas atmosphere.

8. The method as set forth in claim 7 including the step of grinding the outside surface of the first weld bead before depositing any succeeding weld beads.

9. The method as set forth in claim 8 including the steps of depositing multiple weld beads between said bevelled surfaces to completely incorporate said bevelled surfaces into the weld, each surface of a weld bead against which a subsequent weld bead is to be deposited being ground before the subsequent weld bead is deposited.

10. The method as set forth in claim 9 wherein said first weld bead is applied utilizing a welding rod of ferritic steel, and the depositing of multiple weld beads includes the step of making welding passes with an austenitic filler welding rod at a location spaced outwardly from the first weld bead at the apex of the bevelled surfaces.

* * * * *